US011213959B2

(12) United States Patent
Maeda

(10) Patent No.: US 11,213,959 B2
(45) Date of Patent: Jan. 4, 2022

(54) IDENTIFICATION NUMBER SETTING SYSTEM, IDENTIFICATION NUMBER SETTING METHOD, AND ROBOT SYSTEM

(71) Applicant: SEIKO EPSON CORPORATION, Tokyo (JP)

(72) Inventor: Akitoshi Maeda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/117,126

(22) Filed: Dec. 10, 2020

(65) Prior Publication Data

US 2021/0178612 A1  Jun. 17, 2021

(30) Foreign Application Priority Data

Dec. 11, 2019 (JP) .............................. JP2019-223509

(51) Int. Cl.
*B25J 19/00* (2006.01)
*G05B 19/042* (2006.01)
(Continued)

(52) U.S. Cl.
CPC ........... *B25J 19/0029* (2013.01); *B25J 9/126* (2013.01); *B25J 9/161* (2013.01); *G05B 19/0425* (2013.01); *G05B 2219/34245* (2013.01)

(58) Field of Classification Search
CPC ............ B25J 19/0029; G05B 19/0425; G05B 2219/15008; G05B 2219/23336; G05B 2219/25294; G05B 2219/25296; G05B 2219/25297; G05B 2219/33118; G05B 2219/33126; G05B 2219/34245;
(Continued)

(56) References Cited

U.S. PATENT DOCUMENTS

2008/0189445 A1\* 8/2008 Hada .................... G05B 19/042
710/10
2009/0044655 A1\* 2/2009 DeLouis ................ B25J 15/045
74/490.05
(Continued)

FOREIGN PATENT DOCUMENTS

JP  2004318439 A  11/2004
JP  2017158417 A   9/2017
JP  2018099757 A   6/2018

*Primary Examiner* — William Kelleher
*Assistant Examiner* — Gregory T Prather
(74) *Attorney, Agent, or Firm* — Gang Yu

(57) ABSTRACT

An identification number setting system includes a first element component including a first storing section, coupled to a first branch communication line branching from a main line of a bus-type communication wire, and coupled to a power supply, a second element component including a second storing section, coupled to a second branch communication line branching from the main line, and coupled to the power supply to be capable of switching energization and disenergization, and a control device coupled to the main line and configured to communicate with the first element component and the second element component. The control device writes a first identification number in the first storing section in a first state and writes a second identification number different from the first identification number in the second storing section after the writing of the first identification number and in a second state.

8 Claims, 10 Drawing Sheets

(51) Int. Cl.
*B25J 9/16* (2006.01)
*B25J 9/12* (2006.01)

(58) Field of Classification Search
CPC ........... G05B 2219/49298; G05B 2219/49302; G05B 2219/49304
See application file for complete search history.

(56) References Cited

U.S. PATENT DOCUMENTS

| | | | |
|---|---|---|---|
| 2009/0128080 A1* | 5/2009 | Cheng ................ | G05B 19/0423 318/625 |
| 2017/0246741 A1 | 8/2017 | Kobayashi et al. | |
| 2018/0126549 A1* | 5/2018 | He .......................... | B25J 9/161 |
| 2018/0360554 A1* | 12/2018 | Nakanishi ............ | B25J 19/0029 |

* cited by examiner

IDENTIFICATION NUMBER SETTING SYSTEM, IDENTIFICATION NUMBER SETTING METHOD, AND ROBOT SYSTEM

The present application is based on, and claims priority from JP Application Serial Number 2019-223509, filed Dec. 11, 2019, the disclosure of which is hereby incorporated by reference herein in its entirety.

BACKGROUND

1. Technical Field

The present disclosure relates to an identification number setting system, an identification number setting method, and a robot system.

2. Related Art

In recent years, automation of work manually performed in factories has been accelerated by various robots and peripheral devices of the robots because of a hike in personnel expenses and labor shortage. For example, a robot described in JP-A-2004-318439 (Patent Literature 1) is configured by various element components such as encoders and motors. The various element components are controlled independently from one another by a control device. Among the various element components, element components of the same type are coupled to the control device by a bus.

Individual identification numbers are set in the element components. The element components can individually perform communication with the control device. The element components of the same type have the same initial identification number. In order to realize the individual communication with the control device, individual identification numbers need to be allocated to the element components.

In Patent Literature 1, the element components of the same type, for example, the encoders and an external device are coupled. When the external device transmits a signal of specific identification information and the encoders receive the signal, the encoders rewrite identification information of the encoders. Consequently, the specific identification information is allocated to the encoders.

However, in order to set different identification numbers in the element components coupled by the bus, as described in Patent Literature 1, it is necessary to couple the external device to the element components and individually set the identification numbers. Such a method is time-consuming and troublesome.

SUMMARY

An identification number setting system according to an application example includes: a first element component including a first storing section, coupled to a first branch communication line branching from a main line of a bus-type communication wire, and coupled to a power supply; a second element component including a second storing section, coupled to a second branch communication line branching from the main line, and coupled to the power supply to be capable of switching energization and disenergization; and a control device coupled to the main line and configured to communicate with the first element component and the second element component. The control device writes a first identification number in the first storing section in a first state in which electric power is supplied to the first element component and electric power is not supplied to the second element component and writes a second identification number different from the first identification number in the second storing section after the writing of the first identification number and in a second state in which electric power is supplied to the second element component.

An identification number setting system according to an application example includes: a first element component including a first storing section, coupled to a first branch communication line branching from a main line of a bus-type communication wire, and coupled to a power supply; a second element component including a second storing section, coupled to a second branch communication line branching from the main line, and coupled to the power supply to be capable of switching energization and disenergization; and a control device coupled to the main line and able to take a first communication state in which the control device is capable of communicating with the first element component and incapable of communicating with the second element component and a second communication state in which the control device is capable of communicating with the second element component. The control device writes a first identification number in the first storing section in the first communication state and takes the second communication state and writes a second identification number different from the first identification number in the second storing section after the writing of the first identification number.

An identification number setting method according to an application example is an identification number setting method for setting identification numbers different from each other in a first element component including a first storing section, coupled to a first branch communication line branching from a main line of a bus-type communication wire, and coupled to a power supply and a second element component including a second storing section, coupled to a second branch communication line branching from the main line, and coupled to the power supply to be capable of switching energization and disenergization. The identification number setting method includes: a first step of writing a first identification number in the first storing section in a first state in which electric power is supplied to the first element component and electric power is not supplied to the second element component; and a second step of supplying electric power to the second element components to change the first state to a second state and writing a second identification number different from the first identification number in the second storing section after the writing of the first identification number.

A robot system according to an application example includes: a robot including a first element component including a first storing section, coupled to a first branch communication line branching from a main line of a bus-type communication wire, and coupled to a power supply and a second element component including a second storing section, coupled to a second branch communication line branching from the main line, and coupled to the power supply to be capable of switching energization and disenergization; and a control device coupled to the main line and configured to communicate with the first element component and the second element component. The control device writes a first identification number in the first storing section in a first state in which electric power is supplied to the first element component and electric power is not supplied to the second element component and writes a second identification number different from the first identification number in the second storing section after the writing of the first identification number and in a second state in which electric power is supplied to the second element component.

DESCRIPTION OF EXEMPLARY EMBODIMENTS

An identification number setting system, an identification number setting method, and a robot system according to the present disclosure are explained in detail below based on preferred embodiments shown in the accompanying drawings.

First Embodiment

Figure 1:
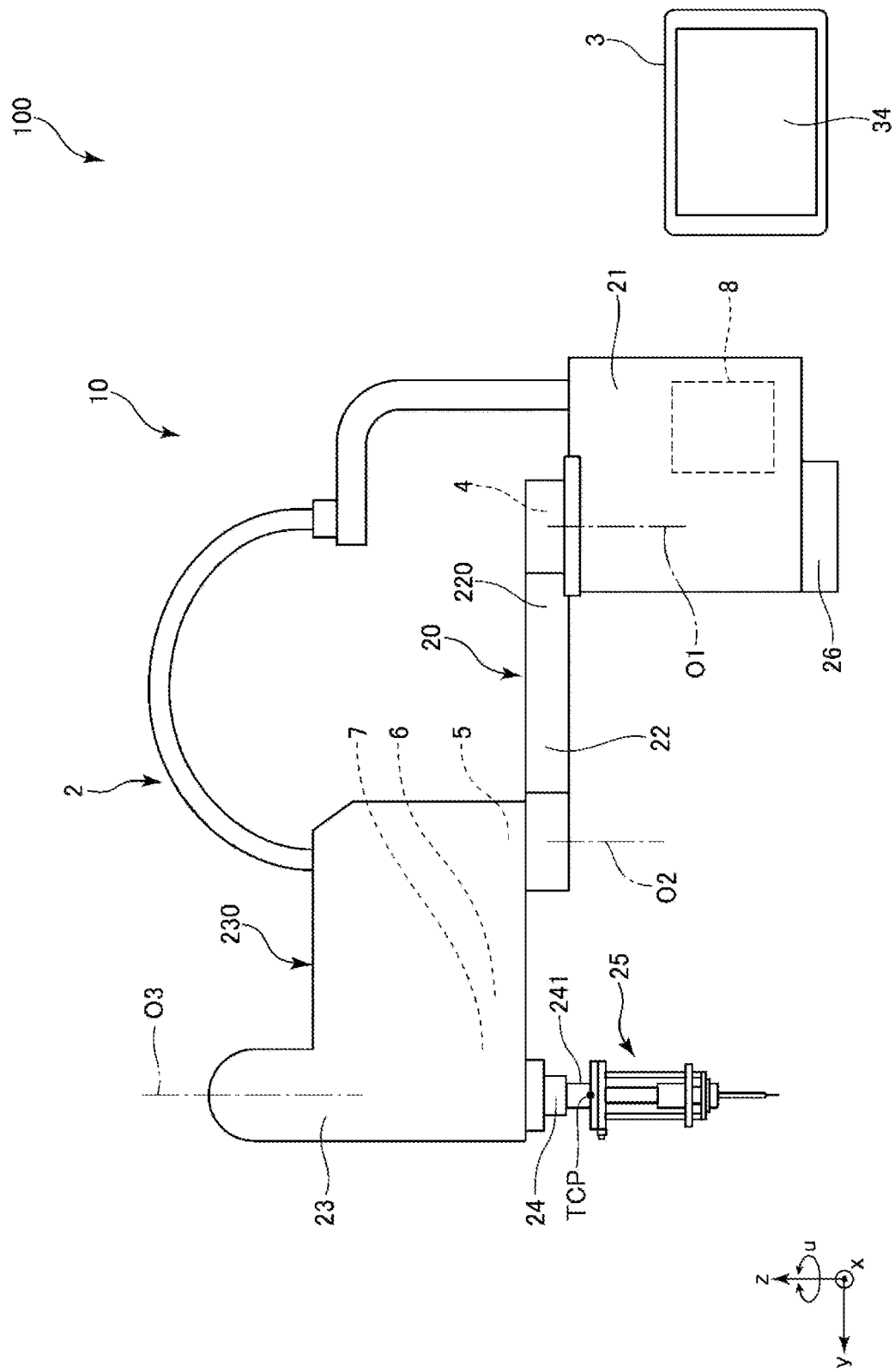
FIG. 1 is a schematic configuration diagram of a robot system including a first embodiment of an identification number setting system according to the present disclosure.
Figure 2:
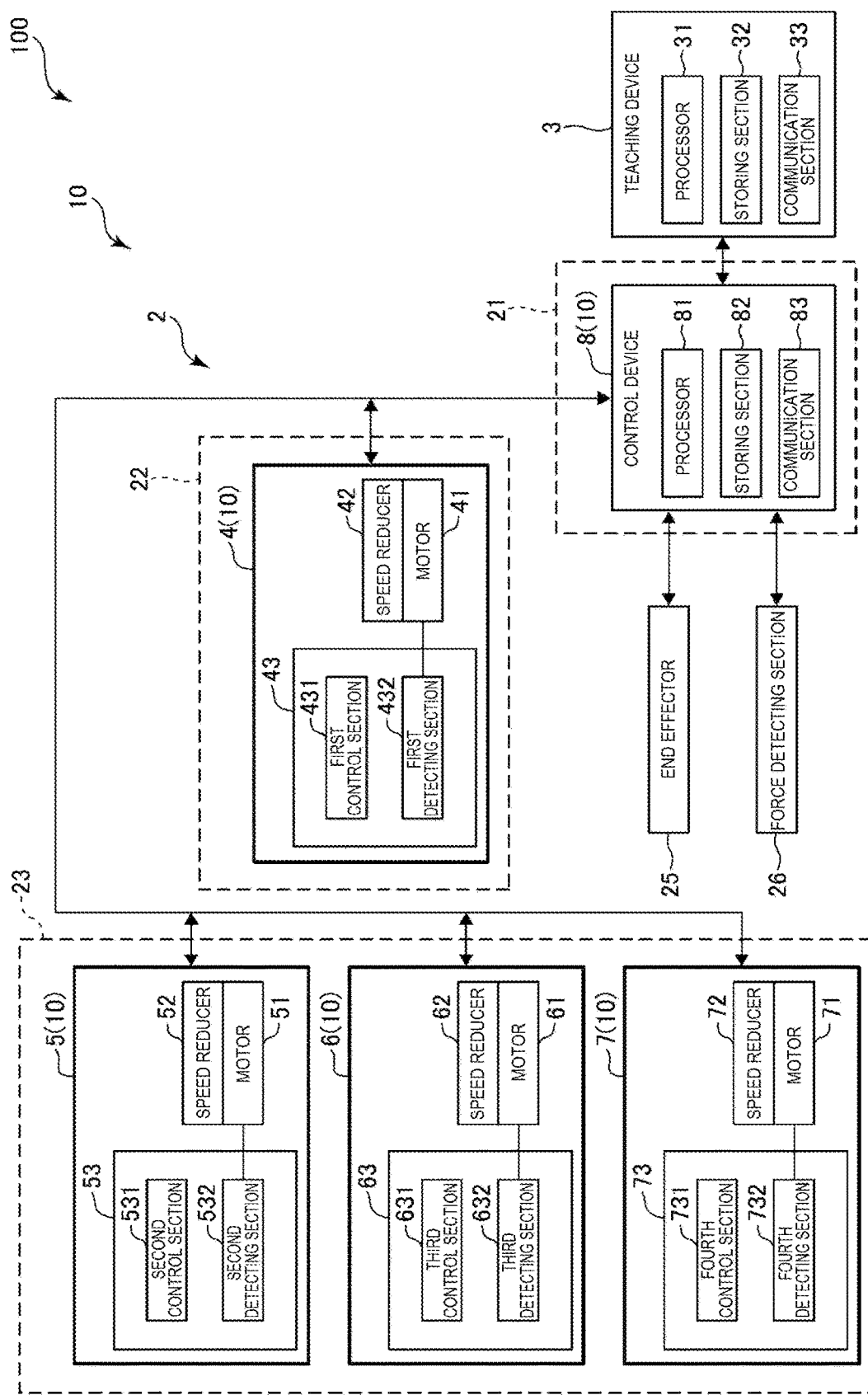
FIG. 2 is a block diagram of a robot system shown in FIG. 1.

FIG. 1 is a schematic configuration diagram of a robot system including an identification number setting system according to the present disclosure. FIG. 2 is a block diagram of the robot system shown in FIG. 1. FIGS. 3 to 6 are detailed block diagrams showing coupling states of a control device and encoder devices in the robot system shown in FIG. 1. FIG. 7 is a flowchart for explaining a control operation performed by the identification number setting system shown in FIG. 1.

In FIG. 1, for convenience of explanation, an x axis, a y axis, and a z axis are shown as three axes orthogonal to one another. In the following explanation, a direction parallel to the x axis is referred to as "x-axis direction" as well, a direction parallel to the y axis is referred to as "y-axis direction" as well, and a direction parallel to the z axis is referred to as "z-axis direction" as well. A direction around the z axis and a direction around an axis parallel to the z axis is referred to as "u direction" as well.

In the following explanation, for convenience of explanation, the distal end side of an arrow of the z axis, that is, the upper side in FIG. 1 is referred to as "upper" or "above" as well and the proximal end side of the arrow, that is, the lower side in FIG. 1 is referred to as "lower" or "below" as well. About a robot arm 20, a base 21 side in FIG. 1 is referred to as "proximal end" and the opposite side of the base 21 side, that is, an end effector 25 side is referred to as "distal end". The z-axis direction, that is, the up-down direction in FIG. 1 is represented as the "vertical direction" and the x-axis direction and the y-axis direction in FIG. 1 are represented as the "horizontal direction".

A robot system 100 shown in FIGS. 1 and 2 is an apparatus used in work such as holding, conveyance, assembly, and inspection of work such as electronic components and electronic devices. The robot system 100 includes a robot 2 including a control device 8 and a teaching device 3 that teaches an operation program to the robot 2.

The robot system 100 includes an identification number setting system 10 according to the present disclosure. The identification number setting system 10 is a system that allocates individual addresses, that is, identification numbers to a first element component and a second element component respectively coupled to the control device 8 via a bus-type communication wire. Consequently, the control device 8 is capable of individually communicating with the first element component and the second element component. As the first element component and the second element component, any two of electronic components coupled to the control device 8 by the bus-type communication wire are applied. This is explained in detail below.

First, the robot 2 is explained.

In an illustrated configuration, the robot 2 is a horizontal articulated robot, that is, a SCARA robot. As shown in FIG. 1, the robot 2 includes the base 21, the robot arm 20 coupled to the base 21, an end effector 25, a force detecting section 26, and the control device 8 that controls operations of these sections.

The base 21 is a portion that supports the robot arm 20. The control device 8 explained below is incorporated in the base 21. The origin of a robot coordinate system is set in any portion of the base 21. The x axis, the y axis, and the z axis shown in FIG. 1 are axes of the robot coordinate system.

The robot arm 20 includes a first arm 22, a second arm 23, and a third arm 24 functioning as a work head.

The robot 2 is not limited to the illustrated configuration. The number of arms may be one or two or may be four or more.

The robot 2 includes a driving unit 4 that rotates the first arm 22 with respect to the base 21, a driving unit 5 that rotates the second arm 23 with respect to the first arm 22, a u-driving unit 6 that rotates a shaft 241 of the third arm 24 with respect to the second arm 23, and a z-driving unit 7 that moves the shaft 241 in the z-axis direction with respect to the second arm 23.

As shown in FIGS. 1 and 2, the driving unit 4 includes a motor 41 that is incorporated in a housing 220 of the first arm 22 and generates a driving force, a speed reducer 42 that reduces the driving force of the motor 41, and a first encoder device 43 that detects a rotation angle of a rotating shaft of the motor 41 or the speed reducer 42.

The driving unit 5 includes a motor 51 that is incorporated in a housing 230 of the second arm 23 and generates a driving force, a speed reducer 52 that reduces the driving force of the motor 51, and a second encoder device 53 that detects a rotation angle of a rotating shaft of the motor 51 or the speed reducer 52.

The u-driving unit 6 includes a motor 61 that is incorporated in the housing 230 of the second arm 23 and generates a driving force, a speed reducer 62 that reduces the driving force of the motor 61, and a third encoder device 63 that detects a rotation angle of a rotating shaft of the motor 61 or the speed reducer 62.

The z-driving unit 7 includes a motor 71 that is incorporated in the housing 230 of the second arm 23 and generates a driving force, a speed reducer 72 that reduces the driving force of the motor 71, and a fourth encoder device 73 that detects a rotation angle, that is, a rotation amount of a rotating shaft of the motor 71 or the speed reducer 72.

As the motors 41, 51, 61, and 71, servomotors such as an AC servomotor and a DC servomotor can be used. The motors 41, 51, 61, and 71 are respectively coupled to not-shown motor drivers corresponding thereto and are controlled by the control device 8 via the motor drivers.

As the speed reducers 42, 52, 62, and 72, for example, a planetary gear-type speed reducer and a wave gear device can be used.

The base 21 is fixed to a not-shown floor surface by a bolt or the like via the force detecting section 26. The first arm 22 is coupled to the upper end portion of the base 21. The first arm 22 is capable of rotating around a first axis O1 along the vertical direction with respect to the base 21. When the driving unit 4 that rotates the first arm 22 is driven, the first arm 22 rotates in the horizontal plane around the first axis O1 with respect to the base 21. In this rotation, a rotation amount of the first arm 22 with respect to the base 21 can be detected by the first encoder device 43.

The second arm 23 is coupled to the distal end portion of the first arm 22. The second arm 23 is capable of rotating around a second axis O2 along the vertical direction with respect to the first arm 22. The axial direction of the first axis O1 and the axial direction of the second axis O2 are the same. That is, the second axis O2 is parallel to the first axis O1. When the driving unit 5 that rotates the second arm 23 is driven, the second arm 23 rotates in the horizontal plane around the second axis O2 with respect to the first arm 22. In this rotation, a rotation amount of the second arm 23 with respect to the first arm 22 can be detected by the second encoder device 53.

The third arm 24 is set and supported at the distal end portion of the second arm 23. The third arm 24 includes the shaft 241. The shaft 241 is capable of rotating around a third axis O3 along the vertical direction with respect to the second arm 23 and is capable of moving in the up-down direction. The shaft 241 is an arm at the most distal end of the robot arm 20.

When the u-driving unit 6 that rotates the shaft 241 is driven, the shaft 241 rotates around the z axis. In this rotation, a rotation amount of the shaft 241 with respect to the second arm 23 can be detected by the third encoder device 63.

When the z-driving unit 7 that moves the shaft 241 in the z-axis direction is driven, the shaft 241 moves in the up-down direction, that is, the z-axis direction. In this movement, a movement amount in the z-axis direction of the shaft 241 with respect to the second arm 23 can be detected by the fourth encoder device 73.

In the robot 2, the distal end of the shaft 241 is set as a control point TCP. A distal end coordinate system having the control point TCP as the origin is set. The distal end coordinate system is already calibrated with the robot coordinate system. A position in the distal end coordinate system can be converted into a position in the robot coordinate system. Consequently, the position of the control point TCP can be specified in the robot coordinate system.

Various end effectors are detachably coupled to the distal end portion of the shaft 241. The end effectors are not particularly limited. Examples of the end effectors include an end effector that grips an object to be conveyed, an end effector that machines a workpiece, and an end effector used for inspection. In this embodiment, the end effecter 25 is detachably coupled.

In this embodiment, the end effector 25 is not a component of the robot 2. However, a part or the entire end effector 25 may be a component of the robot 2.

As shown in FIG. 1, the force detecting section 26 detects force applied to the robot 2, that is, force applied to the robot arm 20 and the base 21. In this embodiment, the force detecting section 26 is provided below, that is, in a z-axis negative direction of the base 21 and supports the base 21 from below.

The force detecting section 26 is configured by a piezoelectric body such as quartz. The force detecting section 26 can include a plurality of elements that output electric charges when receiving external force. The control device 8 can convert, according to an amount of the electric charges, the external force into external force received by the robot arm 20. In such a piezoelectric body, it is possible to adjust, according to a setting direction of the piezoelectric body, a direction in which the electric charges can be generated when the external force is received.

The first to fourth encoder devices 43 to 73 are explained with reference to FIGS. 2 and 3.

The first encoder device 43 includes a first control section 431 including a first processor 431A, a first storing section 431B, and a first communication section 431C and a first detecting section 432.

The second encoder device 53 includes a second control section 531 including a second processor 531A, a second storing section 531B, and a second communication section 531C and a second detecting section 532.

The third encoder device 63 includes a third control section 631 including a third processor 631A, a third storing section 631B, and a third communication section 631C and a third detecting section 632.

The fourth encoder device 73 includes a fourth control section 731 including a fourth processor 731A, a fourth storing section 731B, and a fourth communication section 731C and a fourth detecting section 732.

The first to fourth encoder devices 43 to 73 have the same configuration except that motors, rotation amounts of which are detected, are different. Therefore, the first encoder device 43 is representatively explained below. That is, the first to fourth processors 431A to 731A have the same configuration. The first to fourth storing sections 431B to 731B have the same configuration. The first to fourth communication sections 431C to 731C have the same configuration. The first to fourth detecting sections 432 to 732 have the same configuration.

The first processor 431A is configured by, for example, a CPU (Central Processing Unit) and can read and execute various programs and the like stored in the first storing section 431B.

The first storing section 431B saves the various programs and the like executable by the first processor 431A. Examples of the first storing section 431B include a volatile memory such as a RAM (Random Access Memory), a nonvolatile memory such as a ROM (Read Only Memory), and a memory including a volatile region and a nonvolatile region. In this embodiment, the first storing section 431B is the memory including the volatile region and the nonvolatile region. The first storing section 431B may be a detachable external storage device.

The first communication section 431C performs packet communication with the control device 8. Examples of a communication scheme of the first communication section 431C include serial communication and parallel communication. The serial communication may be synchronous communication or may be asynchronous communication.

The first detecting section 432 includes, for example, a not-shown scale coupled to the rotating shaft of the motor 41 and a not-shown optical element that reads rotation of the scale. The first detecting section 432 outputs a signal corresponding to a rotation amount of the scale to the first control section 431. A detection scheme in the first detecting section 432 is not particularly limited.

The first control section 431 receives the signal output from the first detecting section 432 and calculates a rotation amount of the motor 41. The first control section 431 transmits data of the rotation amount to the control device 8 via the first communication section 431C.

The control device 8 controls the operation of the robot arm 20 based on data received from the first to fourth encoder devices 43 to 73.

As shown in FIGS. 1 and 2, in this embodiment, the control device 8 is incorporated in the base 21. As shown in FIG. 3, the control device 8 has a function of controlling driving of the robot 2 and is electrically coupled to the sections of the robot 2 explained above. The control device 8 includes a processor 81, a storing section 82, and a communication section 83. These sections are communicably coupled to one another, for example, via a bus.

The processor 81 is configured by, for example, a CPU (Central Processing Unit) and reads out and executes various programs and the like stored in the storing section 82. A command signal generated by the processor 81 is transmitted to the robot 2 via the communication section 83. Consequently, the robot arm 20 can execute predetermined work.

The storing section 82 saves various programs and the like executable by the processor 81. Examples of the storing section 82 include a volatile memory such as a RAM (Random Access Memory), a nonvolatile memory such as a ROM (Read Only Memory), and a detachable external storage device.

The communication section 83 performs transmission and reception of signals between the communication section 83 and the sections of the robot 2 and the teaching device 3 using an external interface such as a wireless LAN.

In the illustrated configuration, the control device 8 is incorporated in the base 21. However, the present disclosure is not limited to this. The control device 8 may be disposed on the outer side of the base 21.

The teaching device 3 is explained.

As shown in FIGS. 1 and 2, the teaching device 3 has a function of controlling the operation of the robot arm 20 and includes a processor 31, a storing section 32, a communication section 33, and a display section 34. The teaching device 3 is not particularly limited. Examples of the teaching device 3 include a tablet computer, a personal computer, and a smartphone.

The processor 31 reads out and executes various programs such as a teaching program stored in the storing section 32. The teaching program may be a teaching program generated by the teaching device 3, may be a teaching program stored from an external recording medium such as a CD-ROM, or may be a teaching program stored via a network or the like.

A signal generated by the processor 31 is transmitted to the control device 8 of the robot 2 via the communication section 33. Consequently, the robot arm 20 can execute predetermined work under predetermined conditions. The processor 31 controls driving of the display section 34 shown in FIG. 1.

The storing section 32 saves various programs and the like executable by the processor 31. Examples of the storing section 32 include a volatile memory such as a RAM (Random Access Memory), a nonvolatile memory such as a ROM (Read Only Memory), and a detachable external storage device.

The communication section 33 performs transmission and reception of signals between the communication section 33 and the control device 8 using an external interface such as a wired LAN (Local Area Network) or a wireless LAN.

The display section 34 is configured by various displays including display screens. In the following explanation in this embodiment, as an example, the display section 34 is a touch panel type, that is, the display section 34 includes a display function and an input operation function. When an operator touches a display screen, the processor 31 performs control for switching the display screen to predetermined display.

However, the display section 34 is not limited to such a configuration and may separately include an input operation section. In this case, examples of the input operation section include a mouse and a keyboard. The touch panel, the mouse, and the keyboard may be used together as the input operation section.

The configuration of the robot system 100 is explained above. A setting method for identification numbers for element components of the robot system 100 is explained next. The element components mean the sections configuring the robot system 100. Examples of the element components include the first to fourth encoder devices 43 to 73, the motors 41 to 71, a not-shown plurality of cameras, and not-shown various sensors. In the following explanation, the first to fourth encoder devices 43 to 73 are explained as examples of the element components. A first element component is explained as the first encoder device 43. A second element component is explained as the second encoder device 53. The present disclosure is not limited to this. The first element component and the second element component can be any two element components among the element components explained above.

The identification numbers are parts of information indicating attributes of the first to fourth encoder devices 43 to 73. Specifically, the identification numbers are numbers for specifying individuals in performing communication with the control device 8. Identification numbers different from one another are set in the first to fourth encoder devices 43 to 73. A state in which the identification numbers are respectively set in the first to fourth encoder devices 43 to 73 means a state in which a first identification number is stored in the first storing section 431B of the first encoder device 43, a second identification number is stored in the second storing section 531B of the second encoder device 53, a third identification number is stored in the third storing section 631B of the third encoder device 63, and a fourth identification number is stored in the fourth storing section 731B of the fourth encoder device 73.

In such a state, the first to fourth encoder devices 43 to 73 can individually perform communication with the control device 8. Accordingly, the control device 8 can specify that data received from the first encoder device 43 is information concerning a rotation amount of the motor 41, can specify that data received from the second encoder device 53 is information concerning a rotation amount of the motor 51, can specify that data received from the third encoder device 63 is information concerning a rotation amount of the motor 61, and can specify that data received from the fourth encoder device 73 is information concerning a rotation amount of the motor 71.

Specifically, when the first encoder device 43 transmits data to the control device 8, the first processor 431A of the first encoder device 43 creates the data with a first identification number, for example, "1" set in a header portion and transmits the data to the control device 8.

Similarly, when the second encoder device 53 transmits data to the control device 8, the second processor 531A of the second encoder device 53 creates the data with a second identification number, for example, "2" set in a header portion and transmits the data to the control device 8.

Similarly, when the third encoder device 63 transmits data to the control device 8, the third processor 631A of the third encoder device 63 creates the data with a third identification number, for example, "3" set in a header portion and transmits the data to the control device 8.

Similarly, when the fourth encoder device 73 transmits data to the control device 8, the fourth processor 731A of the fourth encoder device 73 creates the data with a fourth identification number, for example, "4" set in a header portion and transmits the data to the control device 8.

Initial identification numbers are set in such first to fourth encoder devices 43 to 73, for example, at the time of power-off or at the time of replacement with a new product. That is, the initial identification numbers are stored in advance in the first to fourth storing sections 431B to 731B. The initial identification numbers may be the same or may be different for each of the first to fourth encoder devices 43 to 73. In this embodiment, the identification numbers are the same and are "0".

In the robot system 100, the first identification number "1", the second identification number "2", the third identification number "3", and the fourth identification number "4" are set for each of the first to fourth encoder devices 43 to 73. That is, the control device 8 instructs the first to fourth encoder devices 43 to 73 to store the first identification number in the first storing section 431B, store the second identification number in the second storing section 531B, store the third identification number in the third storing section 631B, and store the fourth identification number in the fourth storing section 731B.

As shown in FIGS. 3 to 6, the control device 8 and the first to fourth encoder devices 43 to 73 are respectively coupled by a bus-type communication wire. The bus-type communication wire includes a main line 84, a first branch communication line 85, a second branch communication line 86 branching from the main line 84, a third branch communication line 87 branching from the main line 84, and a fourth branch communication line 88 branching from the main line 84. The first encoder device 43 is coupled to the control device 8 via the main line 84 and the first branch communication line 85. The second encoder device 53 is coupled to the control device 8 via the main line 84 and the second branch communication line 86. The third encoder device 63 is coupled to the control device 8 via the main line 84 and the third branch communication line 87. The fourth encoder device 73 is coupled to the control device 8 via the main line 84 and the fourth branch communication line 88.

The first to fourth encoder devices 43 to 73 are supplied with electric power from a power supply 9 and driven. The power supply 9 and the first to fourth encoder devices 43 to 73 are coupled in series. The first encoder device 43 and the power supply 9 are coupled via a first electric wire 91. The first encoder device 43 and the second encoder device 53 are coupled via a second electric wire 92. The second encoder device 53 and the third encoder device 63 are coupled via a third electric wire 93. The third encoder device 63 and the fourth encoder device 73 are coupled via a fourth electric wire 94.

The first encoder device 43 includes a switch 433 for switching energization and disenergization to the second electric wire 92. The second encoder device 53 includes a switch 533 for switching energization and disenergization to the third electric wire 93. The third encoder device 63 includes a switch 633 for switching energization and disenergization to the fourth electric wire 94. In this embodiment, the first processor 431A switches ON and OFF of the switch 433. The second processor 531A switches ON and OFF of the switch 533. The third processor 631A switches ON and OFF of the switch 633. Energization indicates that an electric current is flowing or an electric current is fed. Disenergization indicates that an electric current is not flowing or an electric current is not fed. Switching timings of energization and disenergization are explained below.

The switch 433 may be a constituent element of the first encoder device 43 or may not be a constituent element of the first encoder device 43. The switch 533 may be a constituent element of the second encoder device 53 or may not be a constituent element of the second encoder device 53. The switch 633 may be a constituent element of the third encoder device 63 or may not be a constituent element of the third encoder device 63.

At the time of power-on of the robot system 100 or when the first to fourth encoder devices 43 to 73 are replaced with new products, an initial identification number "0" is allocated to the first to fourth encoder devices 43 to 73. For the control device 8 to individually perform communication with the first to fourth encoder devices 43 to 73, the first identification number "1" needs to be stored in the first encoder device 43, the second identification number "2" needs to be stored in the second encoder device 53, the third identification number "3" needs to be stored in the third encoder device 63, and the fourth identification number "4" needs to be stored in the fourth encoder device 73. However, in the coupling state by the bus-type communication wire, when the control device 8 is about to allocate identification numbers to the first to fourth encoder devices 43 to 73, the identification numbers "1" to "4" are allocated to the first to fourth encoder devices 43 to 73 at random. In this case, normal communication cannot be performed. The robot arm 20 cannot be normally driven.

Accordingly, in the past, external devices for setting identification numbers are respectively coupled to encoder devices to individually set the identification numbers in the encoder devices. However, such a method is time-consuming and troublesome. Therefore, in the present disclosure, even if the control device 8 and the first to fourth encoder devices 43 to 73 are coupled by the bus-type communication wire, desired identification numbers can be allocated. This is explained below.

Figure 3:
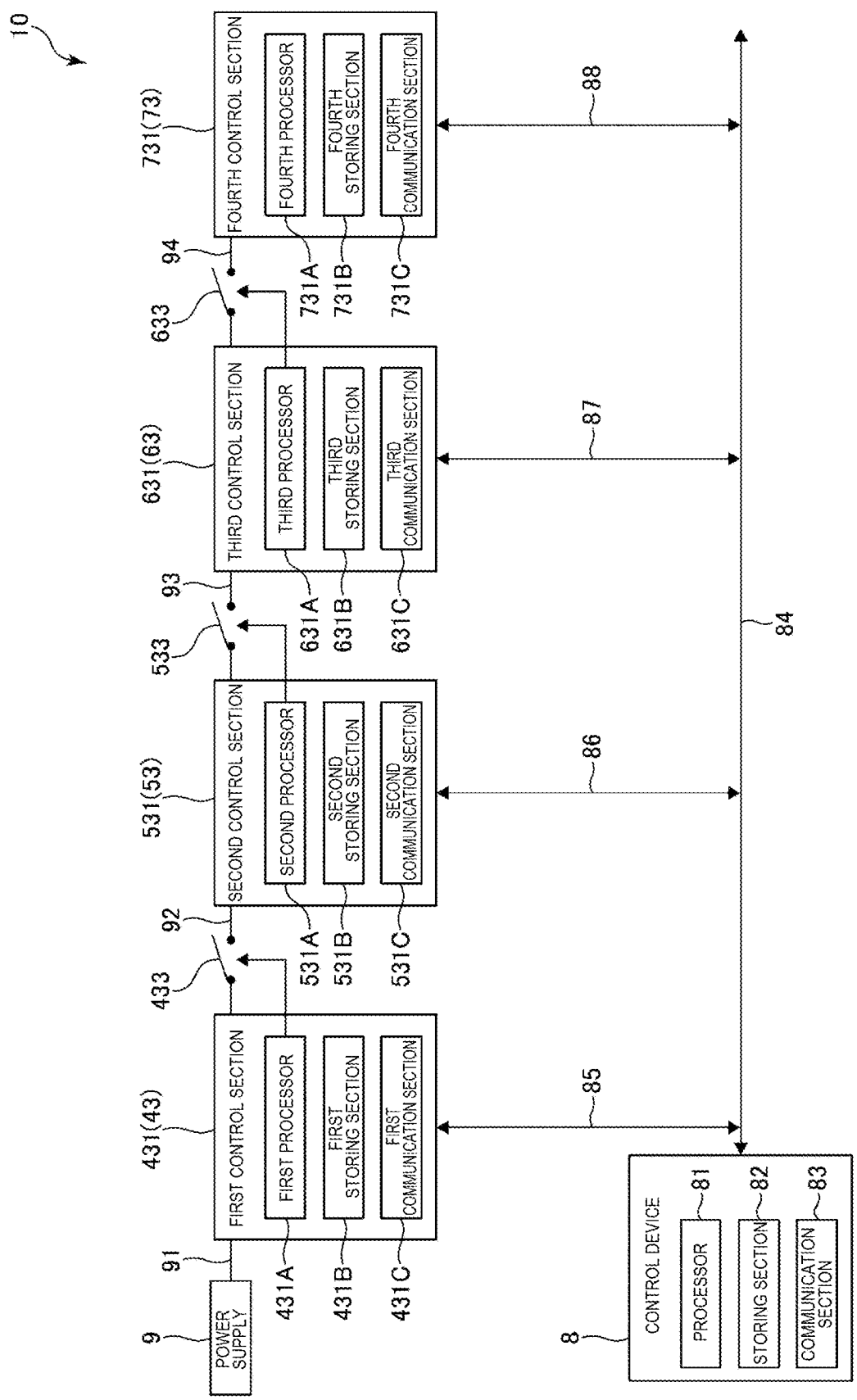
FIG. 3 is a detailed block diagram showing a coupling state of a control device and encoder devices in the robot system shown in FIG. 1.

First, as shown in FIG. 3, the switch 433, the switch 533, and the switch 633 are brought into an OFF state. In this case, electric power is supplied to only the first encoder device 43. Only the first encoder device 43 is capable of communicating with the control device 8. In this state, the processor 81 of the control device 8 instructs the first processor 431A of the first encoder device 43 to write the first identification number "1" in the first storing section 431B. Consequently, the first processor 431A writes the first identification number "1" in the first storing section 431B. Setting of the first identification number in the first encoder device 43 is completed.

Figure 4:
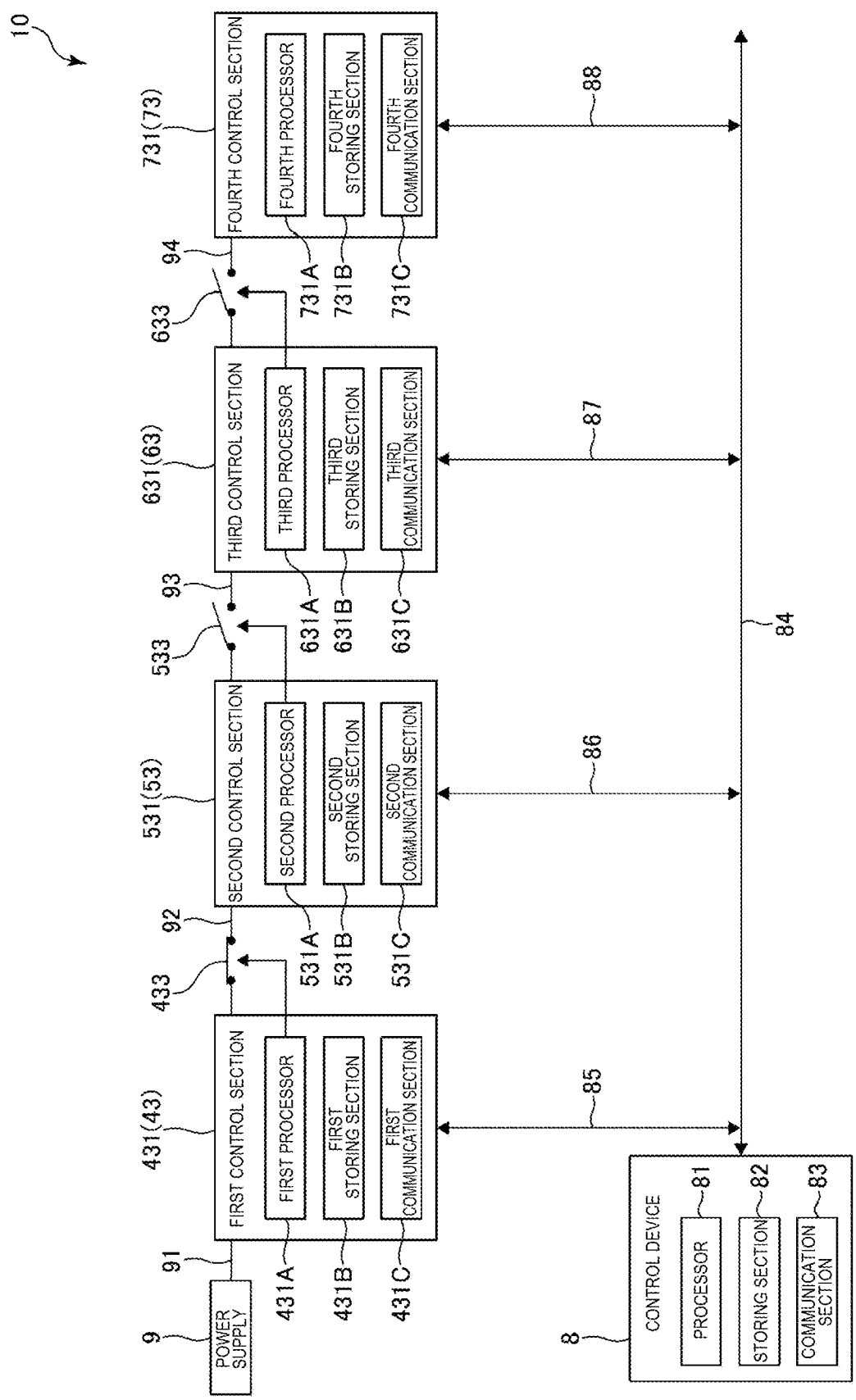
FIG. 4 is a detailed block diagram showing a coupling state of the control device and the encoder devices in the robot system shown in FIG. 1.

When the first identification number "1" is written in the first storing section 431B, as shown in FIG. 4, the first processor 431A brings the switch 433 into an ON state, that is, an energized state. Consequently, electric power is supplied to the second encoder device 53. In this state, electric power is supplied to both of the first encoder device 43 and the second encoder device 53.

Subsequently, the processor 81 of the control device 8 instructs the second processor 531A of the second encoder device 53 to write the second identification number "2" in the second storing section 531B. Consequently, the second processor 531A writes the second identification number "2" in the second storing section 531B. Setting of the second identification number in the second encoder device 53 is completed.

Figure 5:
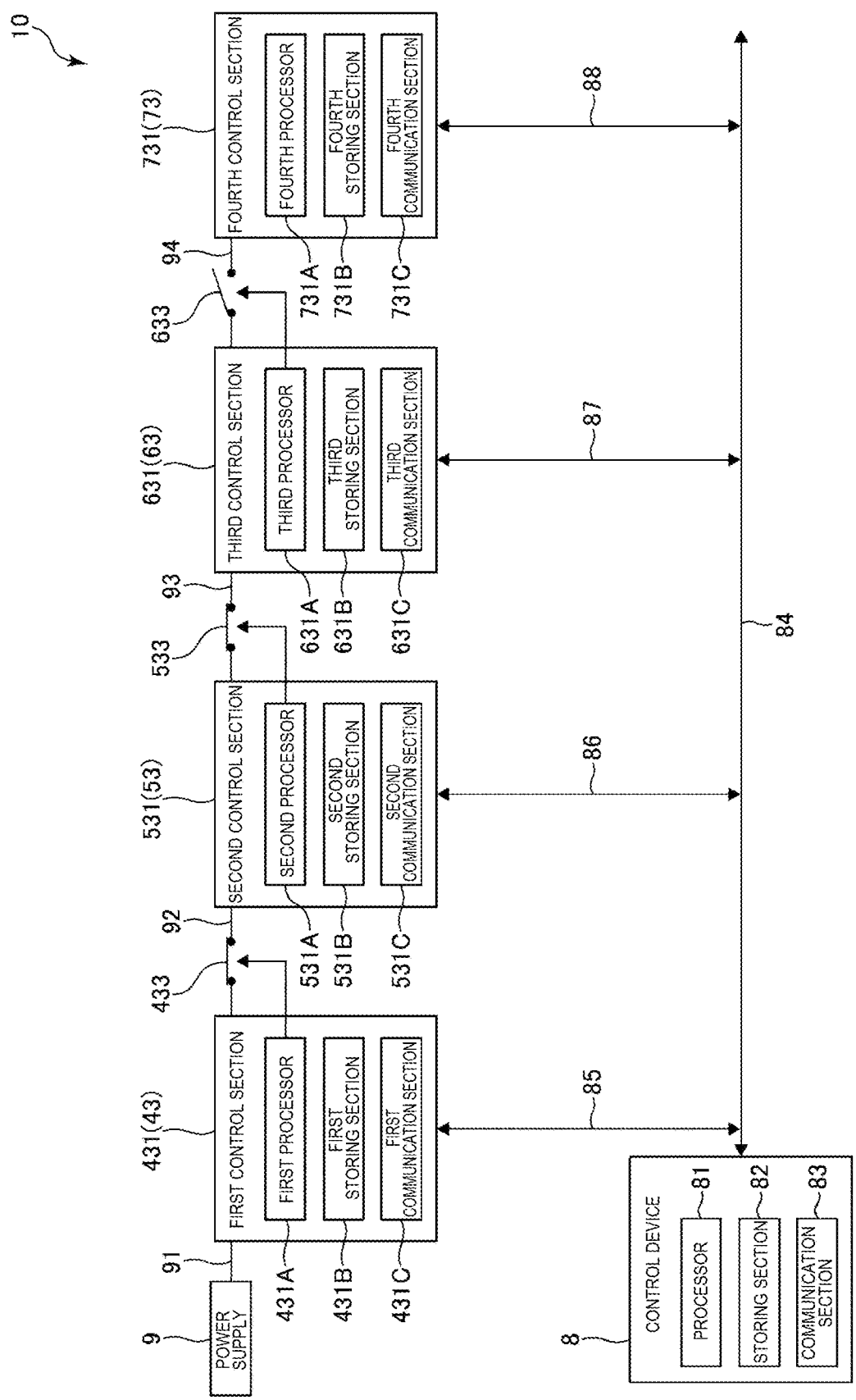
FIG. 5 is a detailed block diagram showing a coupling state of the control device and the encoder devices in the robot system shown in FIG. 1.

When the second identification number "2" is written in the second storing section 531B, as shown in FIG. 5, the second processor 531A brings the switch 533 into an ON state, that is, an energized state. Consequently, electric power is supplied to the third encoder device 63. In this state, electric power is supplied to the first encoder device 43, the second encoder device 53, and the third encoder device 63.

Subsequently, the processor 81 of the control device 8 instructs the third processor 631A of the third encoder device 63 to write the third identification number "3" in the third storing section 631B. Consequently, the third processor 631A writes the third identification number "3" in the third storing section 631B. Setting of the third identification number in the third encoder device 63 is completed.

Figure 6:
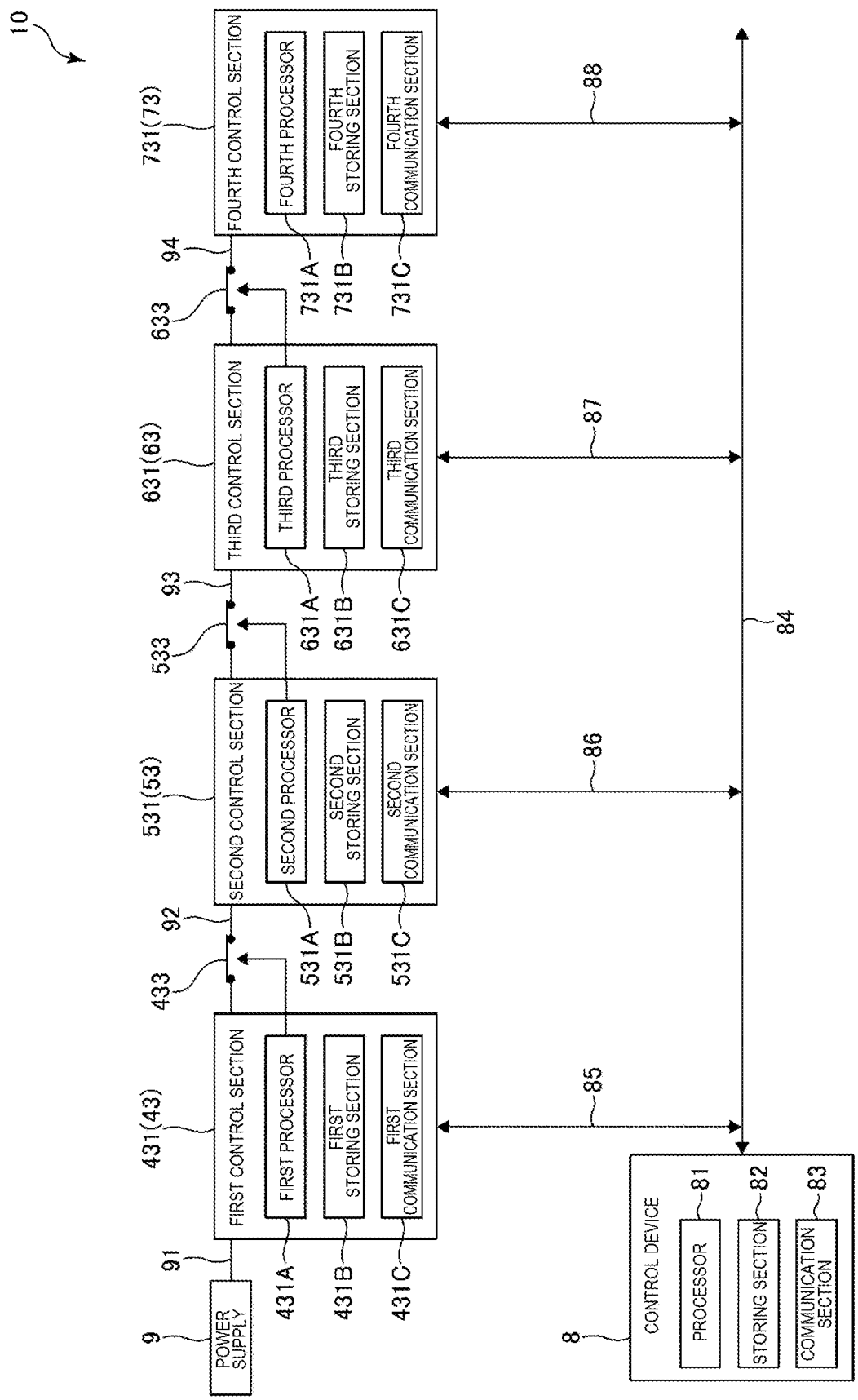
FIG. 6 is a detailed block diagram showing a coupling state of the control device and the encoder devices in the robot system shown in FIG. 1.
Figure 7:
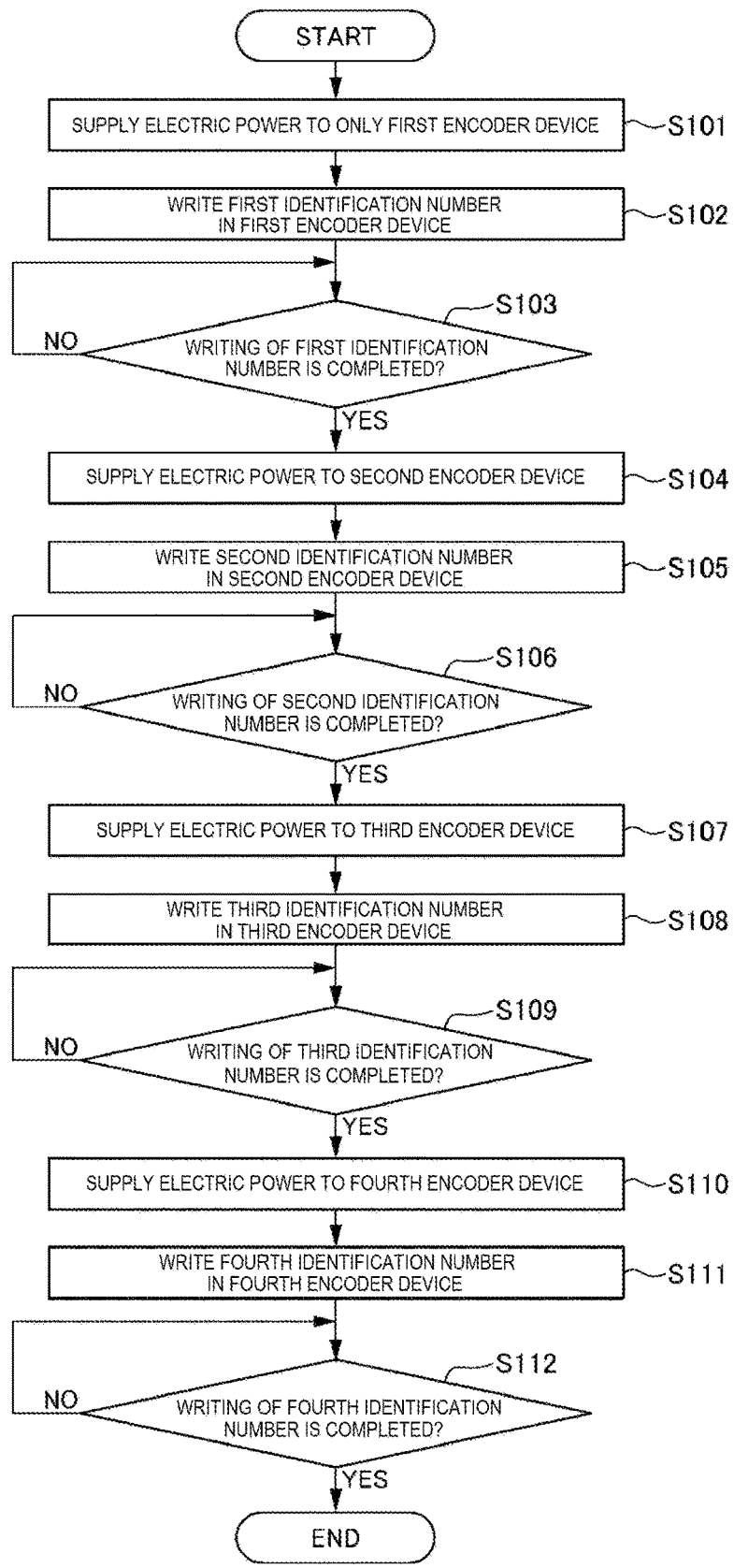
FIG. 7 is a flowchart for explaining a control operation performed by the identification number setting system shown in FIG. 1.

When the third identification number "3" is written in the third storing section 631B, as shown in FIG. 6, the third processor 631A brings the switch 633 into an ON state, that is, an energized state. Consequently, electric power is supplied to the fourth encoder device 73. In this state, electric power is supplied to all of the first to fourth encoder devices 43 to 73.

Subsequently, the processor 81 of the control device 8 instructs the fourth processor 731A of the fourth encoder device 73 to write the fourth identification number "4" in the fourth storing section 731B. Consequently, the fourth processor 731A writes the fourth identification number "4" in the fourth storing section 731B. Setting of the fourth identification number in the fourth encoder device 73 is completed.

In this way, in the identification number setting system 10, the first to fourth encoder devices 43 to 73 are brought into the energized state in order. A specific identification number is allocated to and set in one encoder device brought into the energized state. In other words, when any two encoder devices among the first to fourth encoder devices 43 to 73, for example, the first encoder device 43 and the second encoder device 53 are focused, in a first state in which electric power is supplied to the first encoder device 43 and electric power is not supplied to the second encoder device 53, the control device 8 writes the first identification number in the first storing section 431B and writes the second identification number different from the first identification number in the second storing section 531B after the writing of the first identification number and in a second state in which electric power is supplied to the second encoder device 53. Consequently, identification numbers different from each other can be set in the first encoder device 43 and the second encoder device 53 coupled to the control device 8 by the bus-type communication wire. That is, even if the first element component and the second element component are coupled to the control device 8 by the bus-type communication wire, it is unnecessary to set identification numbers using external communication devices as in the past. Accordingly, it is possible to easily and quickly set desired identification numbers in the element components.

The initial identification number may be stored in volatile regions included in the first to fourth storing sections 431B to 731B or may be stored in nonvolatile regions included in the first to fourth storing sections 431B to 731B. The first to fourth identification numbers may be stored in the volatile regions included in the first to fourth storing sections 431B to 731B or may be stored in the nonvolatile regions included in the first to fourth storing sections 431B to 731B.

When the initial identification number is stored in the volatile regions, the initial identification number may be rewritten into the first to fourth identification numbers, that is, overwritten with the first to fourth identification numbers. In this case, the nonvolatile regions can be omitted in the first to fourth storing sections 431B to 731B. The configuration of the first to fourth storing sections 431B to 731B can be simplified.

In this way, the control device 8 rewrites the initial identification number "0" stored in advance in the first storing section 431B into the first identification number "1" and rewrites the initial identification number "0" stored in advance in the second storing section 531B into the second identification number "2". Consequently, the nonvolatile regions can be omitted in the first to fourth storing sections 431B to 731B. The configuration of the first to fourth storing sections 431B to 731B can be simplified. Resetting of the first to fourth identification numbers can also be performed.

In this case, when a power supply of the robot system 100 is turned off, the first to fourth identification numbers are erased.

In the identification number setting system 10, the first to fourth identification numbers may be written in the nonvolatile regions of the first to fourth storing sections 431B to 731B. That is, when the first storing section 431B includes a first nonvolatile region and the second storing section 531B includes a second nonvolatile region, the control device 8 may write the first identification number in the first nonvolatile region and write the second identification number in the second nonvolatile region. Consequently, the identification numbers do not disappear even if the power supply of the robot system 100 is turned off. Therefore, resetting of the first to fourth identification numbers can be omitted when the power supply is turned on again.

As explained above, the identification number setting system 10 includes the first electric wire 91 that couples the power supply 9 and the first encoder device 43, which is the first element component, the second electric wire 92 that couples the first encoder device 43 and the second encoder device 53, which is the second element component, and the switch 433 for switching energization and disenergization to the second electric wire 92. Consequently, with a simple configuration of switching the switch 433, it is possible to switch, in order, the first state in which electric power is supplied to only the first encoder device 43 and the second state in which electric power is supplied to the second encoder device 53. Accordingly, effects of the present disclosure explained below can be obtained by a simple configuration.

As explained above, the first encoder device 43 functioning as the first element component includes the first control section 431. The first control section 431 switches ON and OFF of the switch 433. Consequently, it is possible to simplify a control operation of the control device 8 compared with a configuration in which the control device 8 switches ON and OFF of the switch 433.

In the second state, that is, the state in which electric power is supplied to the second encoder device 53, which is the second element component, electric power is supplied to both of the first encoder device 43 and the second encoder device 53, which are the first element component. Consequently, in the second state, a step of changing the energized state to the first encoder device 43 to a disenergized state can be omitted. As explained above, even if electric power is supplied to both of the first encoder device 43 and the second encoder device 53, since the first identification number is already set in the first encoder device 43, the second identification number can be set in the second encoder device 53.

As explained above, the identification number setting system 10 according to the present disclosure includes the first encoder device 43, which is the first element component, including the first storing section 431B, coupled to the first branch communication line 85 branching from the main line 84 of the bus-type communication wire, and coupled to the power supply 9, the second encoder device 53, which is the second element component, including the second storing section 531B, coupled to the second branch communication line 86 branching from the main line 84, and coupled to the power supply 9 to be capable of switching energization and disenergization, and the control device 8 coupled to the main line 84 and communicating with the first encoder device 43 and the second encoder device 53. The control device 8 writes the first identification number in the first storing section 431B in the first state in which electric power is supplied to the first encoder device 43 and electric power is not supplied to the second encoder device 53 and writes the second identification number different from the first identification number in the second storing section 531B after the writing of the first identification number and in the second state in which electric power is supplied to the second encoder device 53. Consequently, identification numbers different from each other can be set in the first encoder device 43 and the second encoder device 53 coupled to the control device 8 by the bus-type communication wire. That is, even if the first element component and the second element component are coupled to the control device 8 by the bus-type communication wire, it is unnecessary to set identification numbers using external communication devices as in the past. Accordingly, it is possible to easily and quickly set desired identification numbers in the element components.

The robot system 100 according to the present disclosure includes the robot including the first encoder device 43, which is the first element component, including the first storing section 431B, coupled to the first branch communication line 85 branching from the main line 84 of the bus-type communication wire, and coupled to the power supply 9, the second encoder device 53, which is the second element component, including the second storing section 531B, coupled to the second branch communication line 86 branching from the main line 84, and coupled to the power supply 9 to be capable of switching energization and disenergization and the control device 8 coupled to the main line 84 and communicating with the first encoder device 43 and the second encoder device 53. The control device 8 writes the first identification number in the first storing section 431B in the first state in which electric power is supplied to the first encoder device 43 and electric power is not supplied to the second encoder device 53 and writes the second identification number different from the first identification number in the second storing section 531B after the writing of the first identification number and in the second state in which electric power is supplied to the second encoder device 53. Consequently, the first identification number and the second identification number can be set even after the first encoder device 43 and the second encoder device 53 are built in the robot. That is, it is possible to easily and quickly set desired identification numbers even after the first element component and the second element component are built in the robot. In this embodiment, the robot system 100 in which the base 21 of the robot 2 includes the control device 8 is explained. However, the present disclosure is not limited to this. For example, the control device 8 may be coupled from the outside of the robot 2 to configure the robot system 100.

An example of an identification number setting method according to the present disclosure, that is, an example of a control operation of the control device 8 is explained based on a flowchart of FIG. 7. In the following explanation, the control device 8 executes steps. However, the control device 8 may share the execution of the steps with the teaching device 3.

First, in step S101, the control device 8 supplies electric power to only the first encoder device 43 among the first to fourth encoder devices 43 to 73. That is, as shown in FIG. 3, the control device 8 drives the power supply 9 in a state in which the switches 433 to 633 are turned off. Further, in other words, the control device 8 takes the first state in which electric power is supplied to the first encoder device 43 and electric power is not supplied to the second encoder device 53.

Subsequently, in step S102, the control device 8 writes the first identification number in the first encoder device 43. That is, the control device 8 instructs the first processor 431A of the first encoder device 43 to write the first identification number in the first storing section 431B. Consequently, the first processor 431A writes the first identification number in the first storing section 431B. Setting of the first identification number in the first encoder device 43 is completed.

Step S102 is a first step of writing the first identification number in the first storing section 431B in the first state in which electric power is supplied to the first encoder device 43, which is the first element component, and electric power is not supplied to the second encoder device 53.

Subsequently, in step S103, the control device 8 determines whether the writing of the first identification number is completed. This determination is made based on whether a writing completion signal is received from the first processor 431A.

When determining in step S103 that the writing of the first identification number is completed, in step S104, the control device 8 supplies electric power to the second encoder device 53. That is, the control device 8 instructs the first processor 431A to bring the switch 433 into an ON state as shown in FIG. 4. By bringing the switch 433 into the ON state, electric power from the power supply 9 is supplied to the second encoder device 53 via the first encoder device 43. In other words, the control device 8 takes the second state in which electric power is supplied to the second encoder device 53.

Subsequently, in step S105, the control device 8 writes the second identification number in the second encoder device 53. That is, the control device 8 instructs the second processor 531A of the second encoder device 53 to write the second identification number in the second storing section 531B. Consequently, the second processor 531A writes the second identification number in the second storing section 531B. Setting of the second identification number in the second encoder device 53 is completed.

Subsequently, in step S106, the control device 8 determines whether the writing of the second identification number is completed. This determination is made based on whether a writing completion signal is received from the second processor 531A.

When determining in step S106 that the writing of the second identification number is completed, in step S107, the control device 8 supplies electric power to the third encoder device 63. That is, the control device 8 instructs the second processor 531A to bring the switch 533 into an ON state as shown in FIG. 5. By bringing the switch 533 into the ON state, electric power from the power supply 9 is supplied to the third encoder device 63 via the first encoder device 43 and the second encoder device 53. In other words, the control device 8 takes a third state in which electric power is supplied to the third encoder device 63.

Subsequently, in step S108, the control device 8 writes the third identification number in the third encoder device 63. That is, the control device 8 instructs the third processor 631A of the third encoder device 63 to write the third identification number in the third storing section 631B. Consequently, the third processor 631A writes the third identification number in the third storing section 631B. Setting of the third identification number in the third encoder device 63 is completed.

Subsequently, in step S109, the control device 8 determines whether the writing of the third identification number is completed. This determination is made based on whether a writing completion signal is received from the third processor 631A.

When determining in step S109 that the writing of the third identification number is completed, in step S110, the control device 8 supplies electric power to the fourth encoder device 73. That is, the control device 8 instructs the third processor 631A to bring the switch 633 into an ON state as shown in FIG. 6. By bringing the switch 633 into the ON state, electric power from the power supply 9 is supplied to the fourth encoder device 73 via the first encoder device 43, the second encoder device 53, and the third encoder device 63. In other words, the control device 8 takes a fourth state in which electric power is supplied to the fourth encoder device 73.

Subsequently, in step S111, the control device 8 writes the fourth identification number in the fourth encoder device 73. That is, the control device 8 instructs the fourth processor 731A of the fourth encoder device 73 to write the fourth identification number in the fourth storing section 731B. Consequently, the fourth processor 731A writes the fourth identification number in the fourth storing section 731B. Setting of the fourth identification number in the fourth encoder device 73 is completed.

Subsequently, in step S112, the control device 8 determines whether the writing of the fourth identification number is completed. This determination is made based on whether a writing completion signal is received from the fourth processor 731A.

In step S112, when determining that the writing of the fourth identification number is completed, the control device 8 ends an identification number setting program.

The determination in steps S103, S106, S109, and S112 is performed until it is determined that the writing is completed.

As explained above, the identification number setting method according to the present disclosure is an identification number setting method for setting identification numbers different from each other in the first encoder device 43, which is the first element component, including the first storing section 431B, coupled to the first branch communication line 85 branching from the main line 84 of the bus-type communication wire, and coupled to the power supply 9 and the second encoder device 53, which is the second element component, including the second storing section 531B, coupled to the second branch communication line 86 branching from the main line 84, and coupled to the power supply 9 to be capable of switching energization and disenergization. The identification number setting method according to the present disclosure includes a first step of writing the first identification number in the first storing section 431B in the first state in which electric power is supplied to the first encoder device 43 and electric power is not supplied to the second encoder device 53 and a second step of supplying electric power to the second encoder device 53 to change the first state to the second state and writing the second identification number different from the first identification number in the second storing section 531B after the writing of the first identification number. Consequently, the identification numbers different from each other can be set in the first encoder device 43 and the second encoder device 53 coupled to the control device 8 by the bus-type communication wire. That is, even if the first element component and the second element component are coupled to the control device 8 by the bus-type communication wire, it is unnecessary to set identification numbers using external communication devices as in the past. Accordingly, it is possible to easily and quickly set desired identification numbers in the element components.

Second Embodiment

Figure 8:
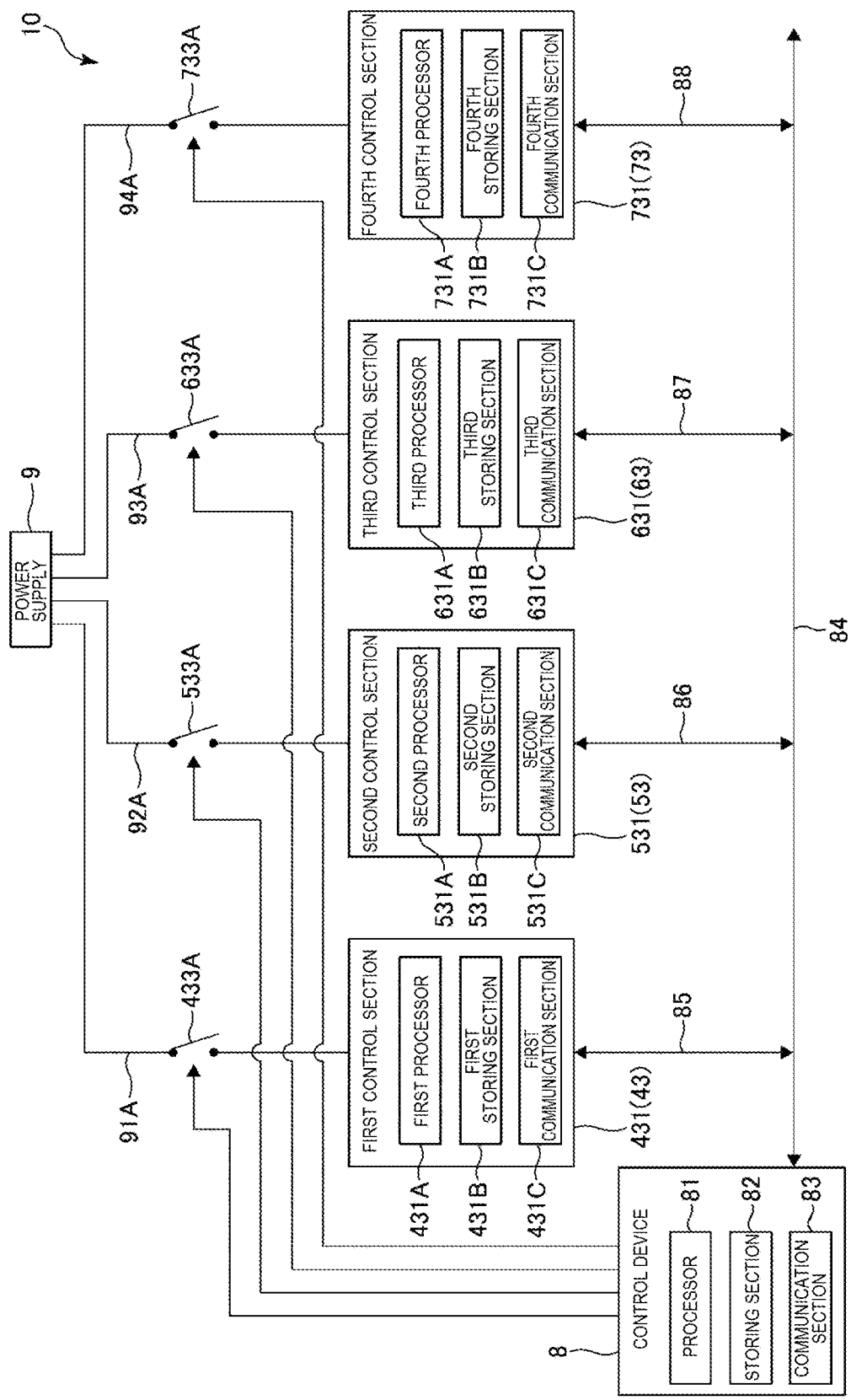
FIG. 8 is a detailed block diagram showing a coupling state of a control device and encoder devices in a robot system including a second embodiment of the identification number setting system according to the present disclosure.

FIG. 8 is a detailed block diagram showing a coupling state of a control device and encoder devices in a robot system including a second embodiment of the identification number setting system according to the present disclosure.

The second embodiment of the identification number setting system, the identification number setting method, and the robot system according to the present disclosure is explained below with reference to FIG. 8. However, differences from the first embodiment are mainly explained. Explanation about similarities to the first embodiment is omitted.

As shown in FIG. 8, in this embodiment, the power supply 9 and the first to fourth encoder devices 43 to 73 are coupled in parallel. That is, the power supply 9 and the first encoder device 43 are coupled via a first electric wire 91A. The power supply 9 and the second encoder device 53 are coupled via a second electric wire 92A. The power supply 9 and the third encoder device 63 are coupled via a third electric wire 93A. The power supply 9 and the fourth encoder device 73 are coupled via a fourth electric wire 94A. The first to fourth electric wires 91A to 94A are electrically independent from one another.

In this embodiment, the switches 433 to 733 shown in FIGS. 3 to 6 are omitted. Instead, the robot system 100 includes a switch 433A for switching energization and disenergization to the first encoder device 43, a switch 533A for switching energization and disenergization to the second encoder device 53, a switch 633A for switching energization and disenergization to the third encoder device 63, and a switch 733A for switching energization and disenergization to the fourth encoder device 73. In this embodiment, ON and OFF of the switches 433A to 733A are controlled by the control device 8.

According to such an embodiment, when the first to fourth identification numbers are set in the first to fourth encoder devices 43 to 73, the first to fourth identification numbers can be set in the same manner as in the first embodiment except steps S101, S104, S107, and S110.

In this embodiment, in step S101, the control device 8 brings the switch 433A into an ON state. In step S104, the control device 8 brings the switch 533A into an ON state. In step S107, the control device 8 brings the switch 633A into an ON state. In step S110, the control device 8 brings the switch 733A into an ON state.

According to such an embodiment, the same effects as the effects in the first embodiment can be obtained. In particular, in this embodiment, after the setting of the identification numbers, even if any one encoder device among the first to fourth encoder devices 43 to 73 is replaced with a new product, by bringing only a switch for switching energization and disenergization to the encoder device into an ON state, an identification number can be set only in the encoder device. In the case of such a configuration, identification numbers are written in the nonvolatile regions of the first to fourth storing sections 431B to 731B of the first to fourth encoder devices 43 to 73.

Third Embodiment

Figure 9:
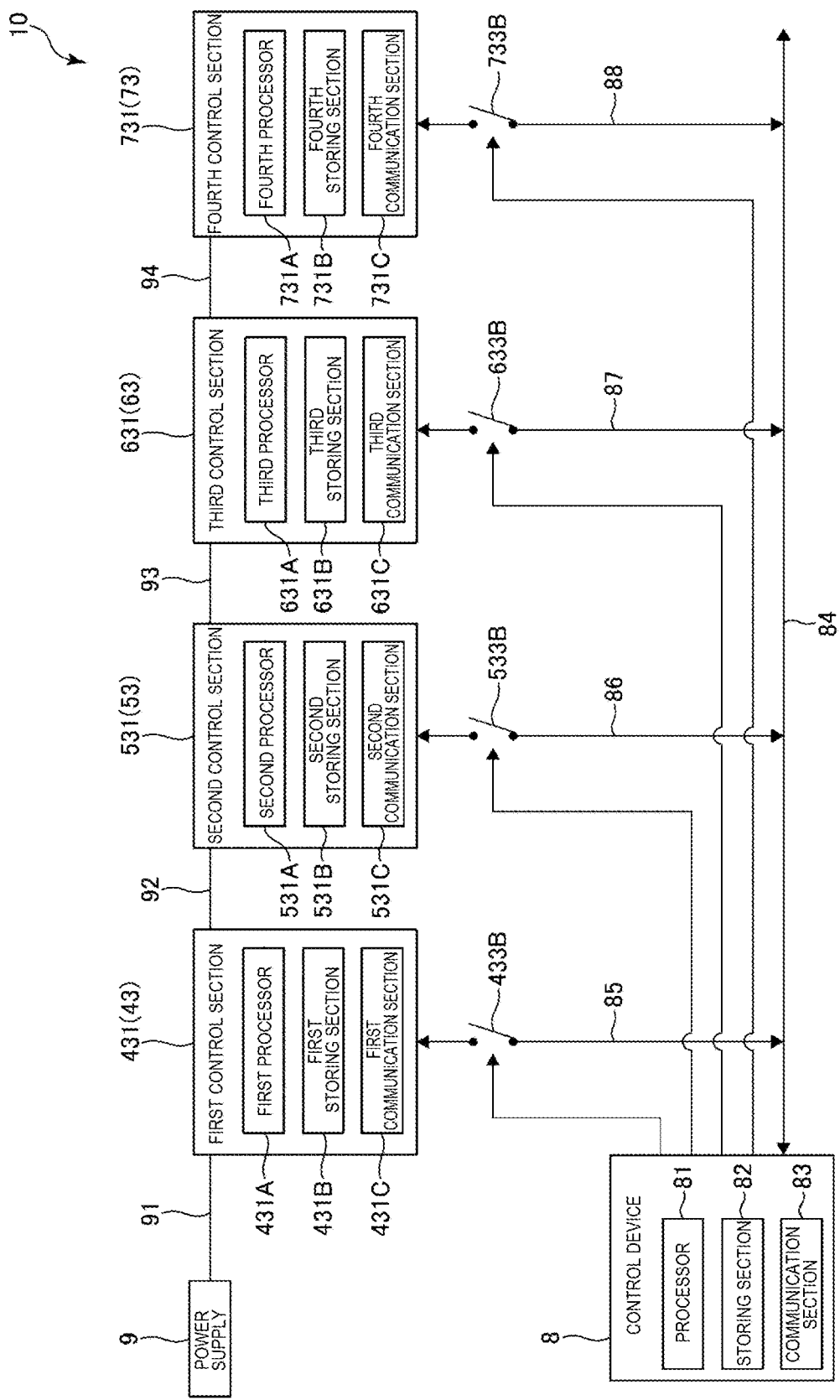
FIG. 9 is a detailed block diagram showing a coupling state of a control device and encoder devices in a robot system including a third embodiment of the identification number setting system according to the present disclosure.
Figure 10:
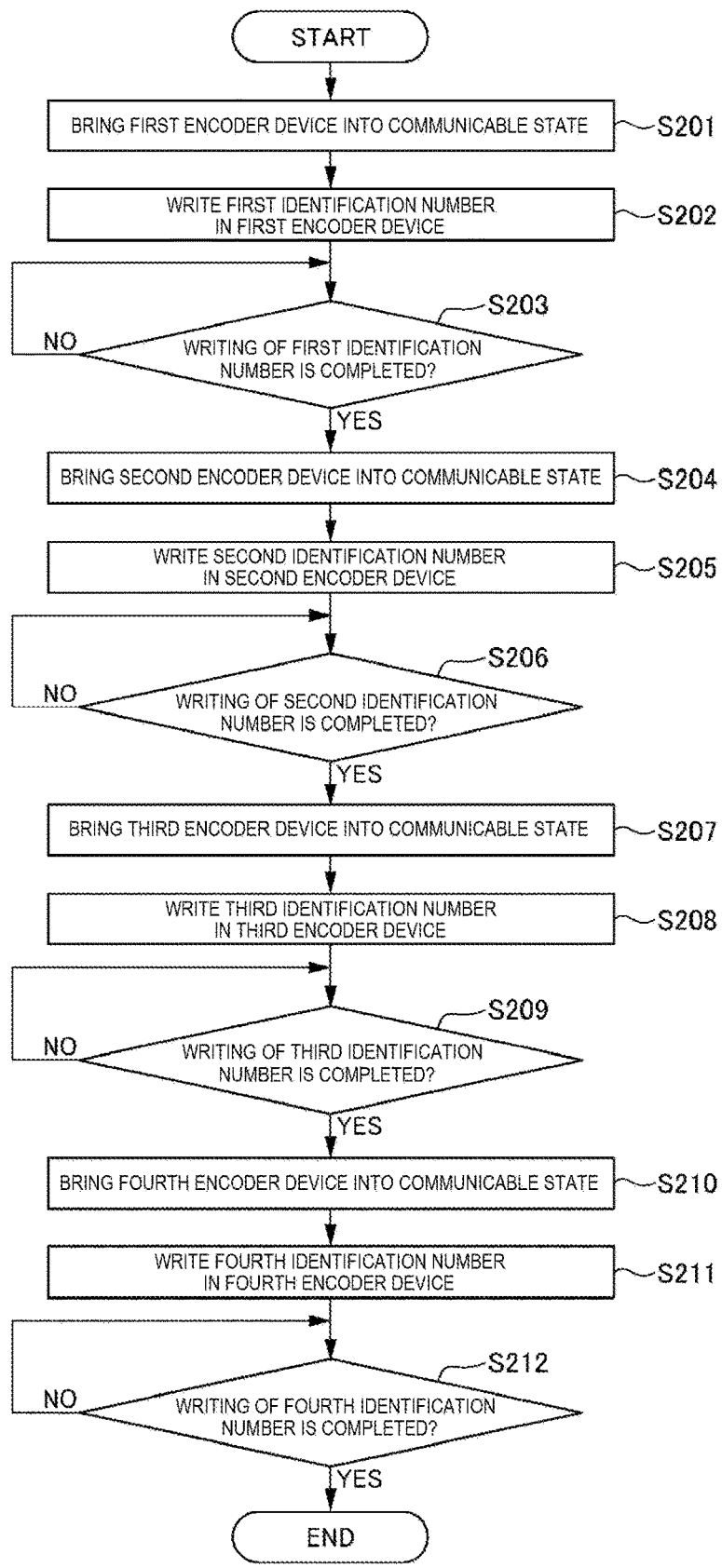
FIG. 10 is a flowchart for explaining a control operation performed by the identification number setting system shown in FIG. 9.

FIG. 9 is a detailed block diagram showing a coupling state of a control device and encoder devices in a robot system including a third embodiment of the identification number setting system according to the present disclosure. FIG. 10 is a flowchart for explaining a control operation performed by the identification number setting system shown in FIG. 9.

The third embodiment of the identification number setting system, the identification number setting method, and the robot system according to the present disclosure is explained with reference to FIG. 9. However, differences from the embodiments explained above are mainly explained. Explanation about similarities to the embodiment is omitted.

As shown in FIG. 9, in this embodiment, the switches 433 to 733 shown in FIGS. 3 to 6 are omitted. Instead, switches 433B, 533B, 633B, and 733B are provided. The switch 433B is provided in the first branch communication line 85. The switch 533B is provided in the second branch communication line 86. The switch 633B is provided in the third branch communication line 87. The switch 733B is provided in the fourth branch communication line 88. In this embodiment, ON and OFF of the switches 433B to 733B are controlled by the control device 8.

An example of the identification number setting method according to the present disclosure, that is, an example of a control operation of the control device 8 is explained based on a flowchart of FIG. 10. In the following explanation, the control device 8 executes steps. However, the control device 8 may share the execution of the steps with the teaching device 3.

Step S202 is the same as step S102. Step S203 is the same as step S103. Step S205 is the same as step S105. Step S206 is the same as step S106. Step S208 is the same as step S108. Step S209 is the same as step S109. Step S211 is the same as step S111. Step S212 is the same as step S112. Therefore, explanation of these steps is omitted. Steps S201, S204, S207, and S210 are explained.

In step S201, the control device 8 brings the switch 433B into an ON state and brings the control device 8 and the first encoder device 43 into a communicable state, that is, a first communication state. In this state, the switches 533B to 733B are in an OFF state. The second to fourth encoder devices 53 to 73 are in an incommunicable state with the control device 8. In such a first communication state, in step S202, the first identification number can be set in the first encoder device 43.

In step S204, the control device 8 brings the switch 533B into an ON state and brings the control device 8 and the second encoder device 53 into a communicable state, that is, a second communication state. In this state, the switch 633B and the switch 733B are in an OFF state. The third encoder device 63 and the fourth encoder device 73 are in an incommunicable state with the control device 8. In such a second communication state, in step S205, the second identification number can be set in the second encoder device 53.

In step S207, the control device 8 brings the switch 633B into an ON state and brings the control device 8 and the third encoder device 63 into a communicable state, that is, a third communication state. In this state, the switch 733B is in an OFF state and the fourth encoder device 73 is an incommunicable state with the control device 8. In such a third communication state, in step S208, the third identification number can be set in the third encoder device 63.

In step S210, the control device 8 brings the switch 733B into an ON state and brings the control device 8 and the fourth encoder device 73 into a communicable state, that is, a fourth communication state. In this state, the switches 433B to 733B are in an ON state. In such a fourth communication state, in step S211, the fourth identification number can be set in the fourth encoder device 73.

As explained above, the identification number setting system 10 according to the present disclosure includes the first encoder device 43, which is the first element component, including the first storing section 431B, coupled to the first branch communication line 85 branching from the main line 84 of the bus-type communication wire, and coupled to the power supply 9, the second encoder device 53, which is the second element component, including the second storing section 531B, coupled to the second branch communication line 86 branching from the main line 84, and coupled to the power supply 9 to be capable of switching energization and disenergization, and the control device 8 coupled to the main line 84 and able to take the first communication state in which the control device 8 is capable of communicating with the first encoder device 43 and incapable of communicating with the second encoder device 53 and the second communication state in which the control device 8 is capable of communicating with the second encoder device 53. The control device 8 writes the first identification number in the first storing section 431B in the first communication state and takes the second communication state and writes the second identification number different from the first identification number in the second storing section 531B after the writing of the first identification number. Consequently, identification numbers different from each other can be set in the first encoder device 43 and the second encoder device 53 coupled to the control device 8 by the bus-type communication wire. That is, even if the first element component and the second element component are coupled to the control device 8 by the bus-type communication wire, it is unnecessary to set identification numbers using external communication devices as in the past. Accordingly, it is possible to easily and quickly set desired identification numbers in the element components.

The first switch 433B may be omitted. In this case, the first to third encoder devices 43 to 63 may switch ON and OFF of the switches 533B to 733B.

The identification number setting system, the identification number setting method, and the robot system according to the present disclosure are explained above based on the illustrated embodiments. However, the present disclosure is not limited to the embodiments. The components of the sections can be replaced with any components having the same functions. Any other components and steps may be respectively added to the identification number setting system, the identification number setting method, and the robot system.

In the embodiments, the first element components and the second element components are explained as the element components configuring the robot. However, the present disclosure is not limited to this. The first element component and the second element component can also be applied to, for example, element components configuring a printing apparatus. In this case, examples of the element components include an inkjet head and a fan.

What is claimed is:

1. An identification number setting system comprising:
   a first element component including a first storing section, coupled to a first branch communication line branching from a main line of a bus-type communication wire, and coupled to a power supply;
   a second element component including a second storing section, coupled to a second branch communication line branching from the main line, and coupled to the power supply to be capable of switching energization and disenergization; and
   a control device coupled to the main line and configured to communicate with the first element component and the second element component, wherein
   the control device writes a first identification number in the first storing section in a first state in which electric power is supplied to the first element component and electric power is not supplied to the second element component and writes a second identification number different from the first identification number in the second storing section after the writing of the first identification number and in a second state in which electric power is supplied to the second element component.

2. The identification number setting system according to claim 1, further comprising:
   a first electric wire coupling the power supply and the first element component;
   a second electric wire coupling the first element component and the second element component; and
   a switch for switching energization and disenergization to the second electric wire.

3. The identification number setting system according to claim 2, wherein
   the first element component includes a first control section, and
   the first control section switches ON and OFF of the switch.

4. The identification number setting system according to claim 1, wherein, in the second state, electric power is supplied to both of the first element component and the second element component.

5. The identification number setting system according to claim 1, wherein the control device rewrites an initial identification number stored in advance in the first storing section into the first identification number and rewrites the initial identification number stored in advance in the second storing section into the second identification number.

6. The identification number setting system according to claim 1, wherein
   the first storing section includes a first nonvolatile region,
   the second storing section includes a second nonvolatile region, and
   the control device writes the first identification number in the first nonvolatile region and writes the second identification number in the second nonvolatile region.

7. An identification number setting method for setting identification numbers different from each other in a first element component including a first storing section, coupled to a first branch communication line branching from a main line of a bus-type communication wire, and coupled to a power supply and a second element component including a second storing section, coupled to a second branch communication line branching from the main line, and coupled to the power supply to be capable of switching energization and disenergization,
   the identification number setting method comprising:
   a first step of writing a first identification number in the first storing section in a first state in which electric power is supplied to the first element component and electric power is not supplied to the second element component; and
   a second step of supplying electric power to the second element components to change the first state to a second state and writing a second identification number different from the first identification number in the second storing section after the writing of the first identification number.

8. A robot system comprising:
   a robot including a first element component including a first storing section, coupled to a first branch communication line branching from a main line of a bus-type communication wire, and coupled to a power supply and a second element component including a second storing section, coupled to a second branch communication line branching from the main line, and coupled to the power supply to be capable of switching energization and disenergization; and
   a control device coupled to the main line and configured to communicate with the first element component and the second element component, wherein
   the control device writes a first identification number in the first storing section in a first state in which electric power is supplied to the first element component and electric power is not supplied to the second element component and writes a second identification number different from the first identification number in the second storing section after the writing of the first identification number and in a second state in which electric power is supplied to the second element component.

* * * * *